Feb. 28, 1928.
J. W. YOST
1,660,983
AUTOMOBILE DIRECTION SIGNAL
Filed April 28, 1927
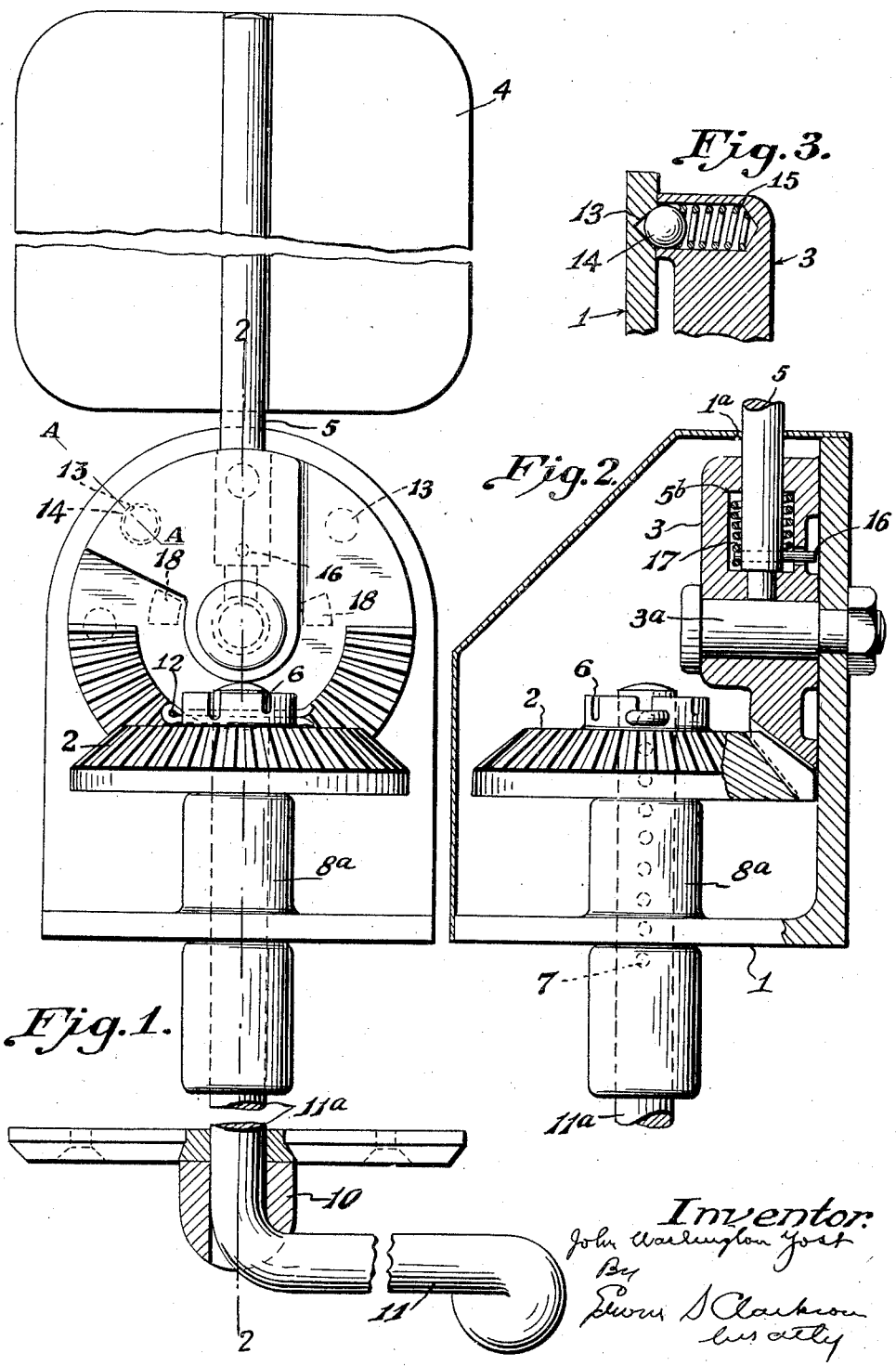
Inventor:
John Warlington Yost
By
Edwin S Clarkson
his atty Patented Feb. 28, 1928.

1,660,983

UNITED STATES PATENT OFFICE.

JOHN WASHINGTON YOST, OF NEWPORT NEWS, VIRGINIA.

AUTOMOBILE DIRECTION SIGNAL.

Application filed April 28, 1927. Serial No. 187,419.

My invention relates to a signal device for indicating when a vehicle is about to turn, and in which direction, also stopping and starting.

The object of my invention is to provide a device of this kind which will serve as a substitute for the arm of the driver.

A further object of my invention is to provide an indicator of this type in which the indicator will normally be held in such position that it cannot be seen from vehicles approaching from the front or rear and to provide means whereby the signal can be easily operated to swing the indicator to project laterally from the vehicle so that it can be readily seen from the rear or front of the vehicle.

A further object of my invention is to provide means for turning the indicator at right angles from its normal inactive position, while it is being moved to assume its lateral or signal position, whereby a relative thin indicator may be used to adapt it to lie close against the vehicle when in inactive position.

A further object of the invention is to provide means whereby the indicator can be operated from within the vehicle be it an open or closed vehicle; and with these and other objects in view, my invention consists of the parts and combination of parts as will be hereinafter pointed out.

In the drawings:

Figure 1 is a top plan view of a signal device embodying my invention, parts being in section and a part of the housing removed.

Figure 2 is a sectional view on the line 2—2, Figure 1.

Figure 3 is a detail sectional view on the line A—A, Figure 1.

The reference numeral 1 designates a housing of suitable construction provided in one of its walls with an elongated slot $1^a$ in which the rod 5 of the signal 4 moves as it is moved into and out of operative position. The housing is provided with a suitable cover.

The housing 1 is provided with a journal bearing $8^a$ in which a shaft $11^a$ is journalled, said shaft having an operating handle 11, positioned, when the device is assembled on a vehicle, within the vehicle. This shaft is provided with a plurality of holes 7 which will be again referred to.

A gear 2 having a hub provided with a collar having a series of recesses 6, said recesses being of different depth as shown in Figure 2 which cooperating with the holes 7 in the shaft $11^a$ enables one to get a wide variation of adjustments of the shaft to accommodate varying thickness of doors or other parts of the vehicle to which the device is attached; for instance, let us suppose that with the pin 12 in the recess 6, and one of the holes 7, as shown, the length of the shaft, as far as the thickness of the vehicle wall is concerned would not be correct, and this could not be corrected by placing the pin 12 in the next succeeding hole 7. This can be overcome by placing the pin in one of the other of the recesses 6 which is found to be the proper one. Of course, in material adjustments the pin 12 is moved to succeeding holes 7, from which it will be seen that a wide variation of take ups of the shaft $11^a$ can be made. The pin 12 keys the gear 2 to the shaft $11^a$.

A journal $3^a$ is secured to the housing at right angles to the shaft $11^a$, as shown in Figure 2, on which is journalled the gear wheel 3 adapted to mesh with the gear 2. As will be seen, the teeth of gear 3 do not extend entirely around the periphery of the gear and in the interrupted portion of the gear I provide a recess $5^b$ adapted to receive the inner end of the signal rod 5, a coiled spring 17 being around the end of the rod 5 within said recess $5^b$, one end of the spring being anchored to the rod, while its other end is anchored to a wall of the recess; a pin 16 is secured to and projects beyond one side of the rod 5 and is adapted to contact with a cam 18 which is mounted rigidly on the wall of the housing.

As shown in Figure 3, one wall of the housing is provided with ball seats 13, while the gear 3 is provided with a ball brake or lock 14 held to position by the spring 15, the purpose of which is to hold the indicator in the position in which it is set and insure the indicator being set in the proper position.

In operation the shaft $11^a$ is revolved by the handle 11 which in turn rotates gear 2, and gear 3. Before this movement the rod 5 is in a vertical position against the side of the vehicle and the indicator 4 being of flat thin material is snug against the side of the vehicle and cannot be seen from the front or the rear of the vehicle. Now as the gear 3 revolves the post 5 is moved away from the vehicle in the slot $1^a$ and at a predetermined time the pin 16 engages the cam 18 and by continued movement of the gear 3 the pin rides up on cam 18 thereby revolving the rod 5 until the flat face of the indicator 4 is at right angles to the vehicle, and extending therefrom so that this flat face is presented to traffic from the rear and front of the vehicle and according to its position gives to traffic a stop, turn, or other desired signal.

It will, of course, be understood that for night driving I may place the lights on the paddle.

What I claim is:

1. A direction indicator for vehicles, comprising a housing, a gear train in said housing, means to operate said train, a rod revolubly secured to one of said gears, a pin extending from said rod, and a cam on the housing adapted to engage said pin and revolve the rod relatively to the gear in which it is mounted.

2. A direction indicator for vehicles, comprising a housing, a shaft journalled in said housing and provided with a plurality of holes therethrough, a gear having a plurality of recesses of varying depth in its hub, a pin adapted to pass through one of said recesses in the hub, a hole in the shaft thereby connecting the gear and shaft, a second gear wheel journalled in the housing and meshing with the first named gear, a recess in said second gear, a rod revolubly mounted in said recess, means to normally hold said rod against rotation, a pin extending from the rod, and a cam on the housing to raise said pin and thereby revolve the rod relatively to the said second gear, and a signal connected to said rod.

In testimony whereof I affix my signature.

JOHN WASHINGTON YOST.